(12) United States Patent
Rastegar et al.

(10) Patent No.: US 10,876,824 B2
(45) Date of Patent: Dec. 29, 2020

(54) INTEGRATED EVENT DETECTION AND ELECTRICAL GENERATOR DEVICES FOR GRAVITY DROPPED OR EJECTED WEAPONS

(71) Applicant: Omnitek Partners LLC, Ronkonkoma, NY (US)

(72) Inventors: Jahangir S Rastegar, Stony Brook, NY (US); Jacques Fischer, Sound Beach, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 16/695,058

(22) Filed: Nov. 25, 2019

(65) Prior Publication Data
US 2020/0103211 A1 Apr. 2, 2020

Related U.S. Application Data

(63) Continuation of application No. 15/985,648, filed on May 21, 2018, now Pat. No. 10,488,169.

(60) Provisional application No. 62/581,679, filed on Nov. 4, 2017, provisional application No. 62/510,222, filed on May 23, 2017.

(51) Int. Cl.
| | |
|---|---|
| *F42C 11/00* | (2006.01) |
| *F42C 15/40* | (2006.01) |
| *F42C 15/00* | (2006.01) |
| *F42B 25/00* | (2006.01) |
| *F42C 14/06* | (2006.01) |

(52) U.S. Cl.
CPC ............ *F42C 11/008* (2013.01); *F42B 25/00* (2013.01); *F42C 14/06* (2013.01); *F42C 15/005* (2013.01); *F42C 15/40* (2013.01)

(58) Field of Classification Search
CPC ...... F41A 1/02; F41A 1/00; F41A 1/30; F41B 6/00; F41B 6/003; F41B 6/006
USPC .............................................. 89/8
See application file for complete search history.

(56) References Cited

U.S. PATENT DOCUMENTS

| | | | | |
|---|---|---|---|---|
| 3,757,695 A * | 9/1973 | Fisher | ..................... | F42C 11/00 102/207 |
| 3,861,312 A * | 1/1975 | Held | ....................... | F42C 11/04 102/208 |
| 4,478,127 A * | 10/1984 | Hennings | ................. | B64D 1/04 102/225 |
| 4,586,436 A * | 5/1986 | Denney | ................ | F42C 11/065 102/200 |
| 6,664,759 B1 * | 12/2003 | Goris | .................... | H01M 10/44 320/107 |
| 7,301,454 B2 * | 11/2007 | Seyfang | ................... | G01D 1/18 310/339 |
| 8,443,726 B2 * | 5/2013 | Rastegar | ................ | F42C 15/40 102/207 |

(Continued)

*Primary Examiner* — Joshua E Freeman

(57) ABSTRACT

A device for generating power in a gravity dropped munition. The device including: a drum; a cable wound around a drum; a generator for producing electrical energy; a spring configured to convert rotation of the drum to energy as the cable is unwound from the drum; and an intermediate member selectively engaging the drum to the generator; wherein the intermediate member is disengaged from the drum when the cable is being unwound from the drum and the intermediate member is engaged with the generator when the cable is released from the drum to produce power from the generator.

7 Claims, 16 Drawing Sheets

(56) References Cited

U.S. PATENT DOCUMENTS

| | | | | |
|---|---|---|---|---|
| 9,976,839 B2* | 5/2018 | Rastegar | ............... | F42C 11/008 |
| 10,030,958 B2* | 7/2018 | Rastegar | ............... | F42C 11/008 |
| 2010/0038916 A1* | 2/2010 | Yomoda | .................. | H04M 1/21 |
| | | | | 290/1 E |
| 2010/0236440 A1* | 9/2010 | Rastegar | ............... | F42C 11/008 |
| | | | | 102/209 |
| 2012/0291613 A1* | 11/2012 | Rastegar | ................. | B64D 1/06 |
| | | | | 89/1.54 |
| 2014/0060367 A1* | 3/2014 | Rastegar | ................. | H02N 2/18 |
| | | | | 102/207 |
| 2014/0225376 A1* | 8/2014 | Rastegar | ............... | F42C 11/008 |
| | | | | 290/1 E |
| 2016/0377401 A1* | 12/2016 | Rastegar | ................ | H02P 9/006 |
| | | | | 102/254 |
| 2016/0377402 A1* | 12/2016 | Rastegar | ............... | H02K 7/116 |
| | | | | 102/247 |

* cited by examiner

INTEGRATED EVENT DETECTION AND ELECTRICAL GENERATOR DEVICES FOR GRAVITY DROPPED OR EJECTED WEAPONS

CROSS-REFERENCE TO RELATED APPLICATIONS

This application is a continuation application of U.S. patent application Ser. No. 15/985,648, filed on May 21, 2018, which claims the benefit to earlier filed U.S. Provisional Patent Application Nos. 62/510,222, filed May 23, 2017 and 62/581,679, filed on Nov. 4, 2017, the entire contents of each of which are incorporated herein by reference.

GOVERNMENT RIGHTS

This invention was made with Government support under contract FA8651-10-C-0145 awarded by the United States Air Force. The Government has certain rights in the invention.

BACKGROUND

1. Field

The present disclosure is generally directed to safe arm fuses and power generation devices for gravity dropped or ejected weapons, and more particularly to gravity dropped or ejected weapon release event detection and power generation onboard gravity dropped or ejected weapons.

2. Prior Art

All weapon systems require fuzing systems for their safe and effective operation. A fuze or fuzing system is designed to provide as a primary role safety and arming functions to preclude munitions arming before the desired position or time, and to sense a target or respond to one or more prescribed conditions, such as elapsed time, pressure, or command, and initiate a train of fire or detonation in a munition.

Fuze safety systems consist of an aggregate of devices (e.g., environment sensors, timing components, command functioned devices, logic functions, plus the initiation or explosive train interrupter, if applicable) included in the fuze to prevent arming or functioning of the fuze until a valid environment has been sensed and the arming delay has been achieved.

Safety and arming devices are intended to function to prevent the fuzing system from arming until an acceptable set of conditions (generally at least two independent conditions) have been achieved.

A significant amount of effort has been expended to miniaturize military weapons to maximize their payload and their effectiveness and to support unmanned missions. The physical tasking of miniaturization efforts has been addressed to a great extent. However, the same cannot be said regarding ordnance technologies that support system functional capabilities, for example for the case for fuzing sensors and powering for gravity dropped or ejected weapons.

It is important to note that simple miniaturization of subsystems alone will not achieve the desired goal of effective fuzing for smaller weapons. This is particularly the case in regards to environmental sensing and the use of available stimuli in support of "safe" and "arm" functionality in fuzing of small gravity dropped or ejected weapons.

A need therefore exists for the development of methods and devices that utilize available external stimuli and relevant detectable events for the design of innovative "safe" and "arm" (S&A) mechanisms for fuzing of gravity dropped or ejected weapons, in particular small weapons.

SUMMARY

Accordingly, a method for generating power in a gravity dropped munition, the method comprising: winding a cable around a drum of a generator associated with the munition; attaching the cable from the generator to a portion of an aircraft; separating the munition from the aircraft to unwind the cable from the drum to release the cable from the drum after a predetermined amount of rotation of the drum; converting the rotation of the drum to energy in a spring as the cable is unwound from the drum; restricting movement of an intermediate member connecting the drum to the generator while the cable is being unwound from the drum; and ending the restricting when the cable is released from the drum allowing the intermediate member to engage the drum with the generator to produce power from the generator.

The intermediate member can be a first gear connecting the drum to a second gear at the generator.

The restricting can comprise restricting rotation of the intermediate member in a same direction as an unwinding direction of the drum as the cable is unwound from the drum. The restricting can comprise permitting rotation of the intermediate member in a direction opposite to the same direction as the unwinding direction of the drum as the cable is unwound from the drum.

The restricting can comprise routing the cable through a portion of the intermediate member to restrict all movement of the intermediate member as the cable is unwound from the drum.

The method can further comprise restricting a movement of the drum in a direction opposite to an unwinding direction as the cable is unwound from the drum. The method can further comprise removing the restricting of the movement of the drum in the direction opposite to an unwinding direction after the cable is fully unwound from the drum.

Also provided is a device for generating power in a gravity dropped munition, the device comprising: a drum; a cable wound around a drum; a generator for producing electrical energy; a spring configured to convert rotation of the drum to energy as the cable is unwound from the drum; and an intermediate member selectively engaging the drum to the generator; wherein the intermediate member is disengaged from the drum when the cable is being unwound from the drum and the intermediate member is engaged with the generator when the cable is released from the drum to produce power from the generator.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION

Figure 1:
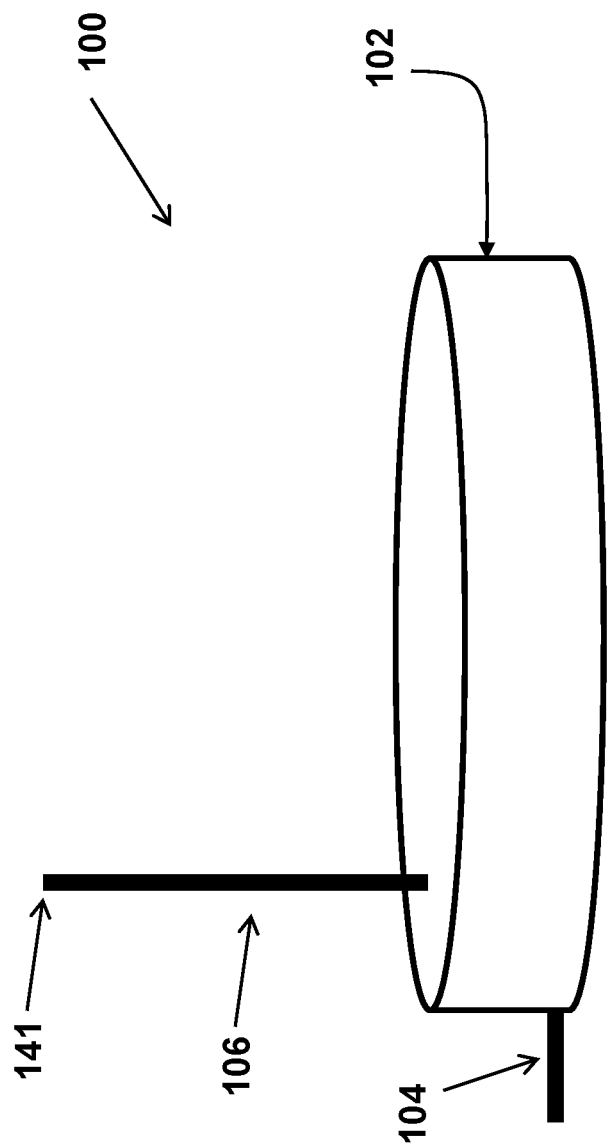
FIG. 1 illustrates an isometric view of one embodiment of the gravity dropped or ejected weapon release event detection device with an integrated electrical generator.
Figure 2:
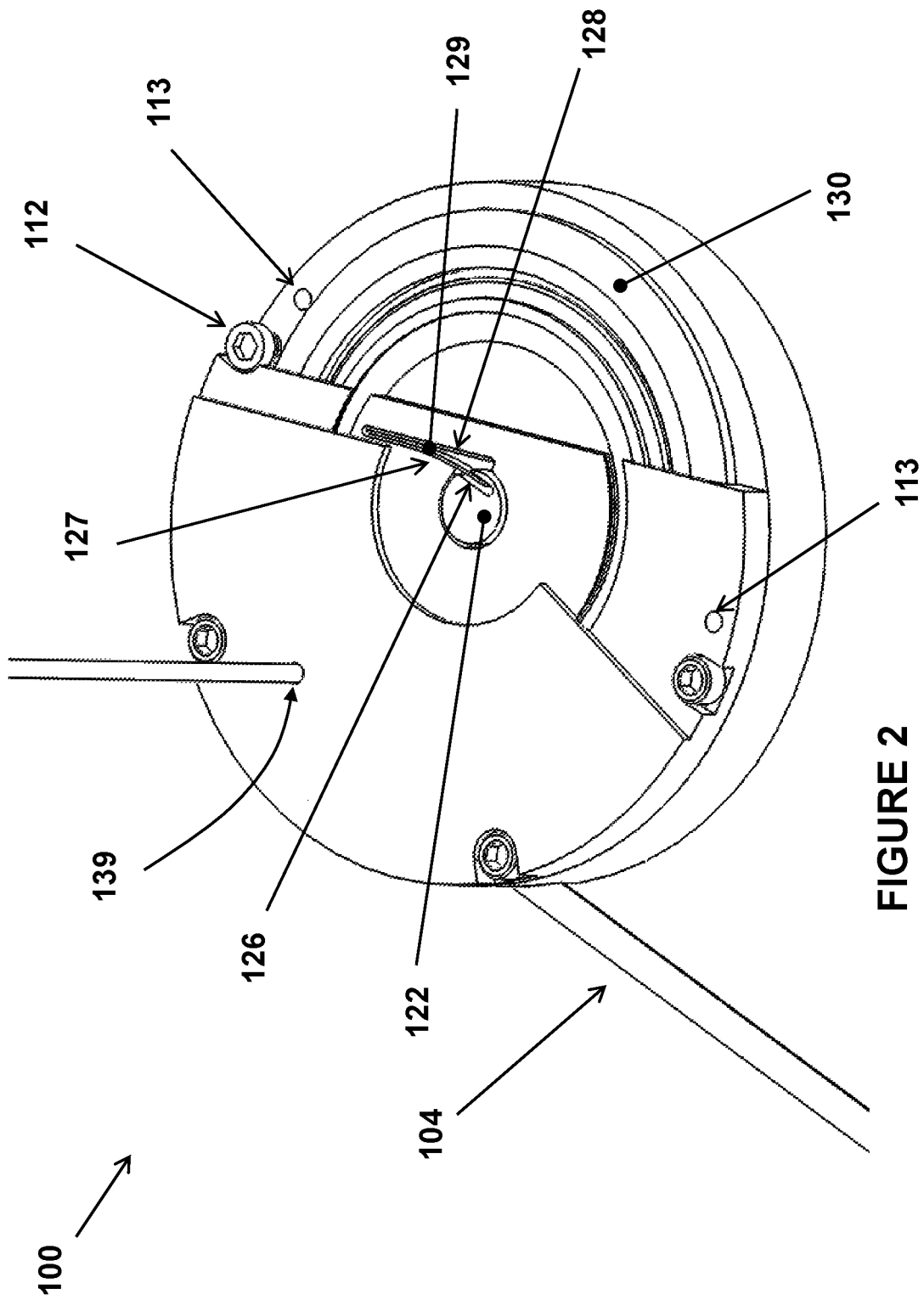
FIG. 2 illustrates the internal components of the gravity dropped or ejected weapon release event detection device with an integrated electrical generator of FIG. 1 from the device top.
Figure 3:
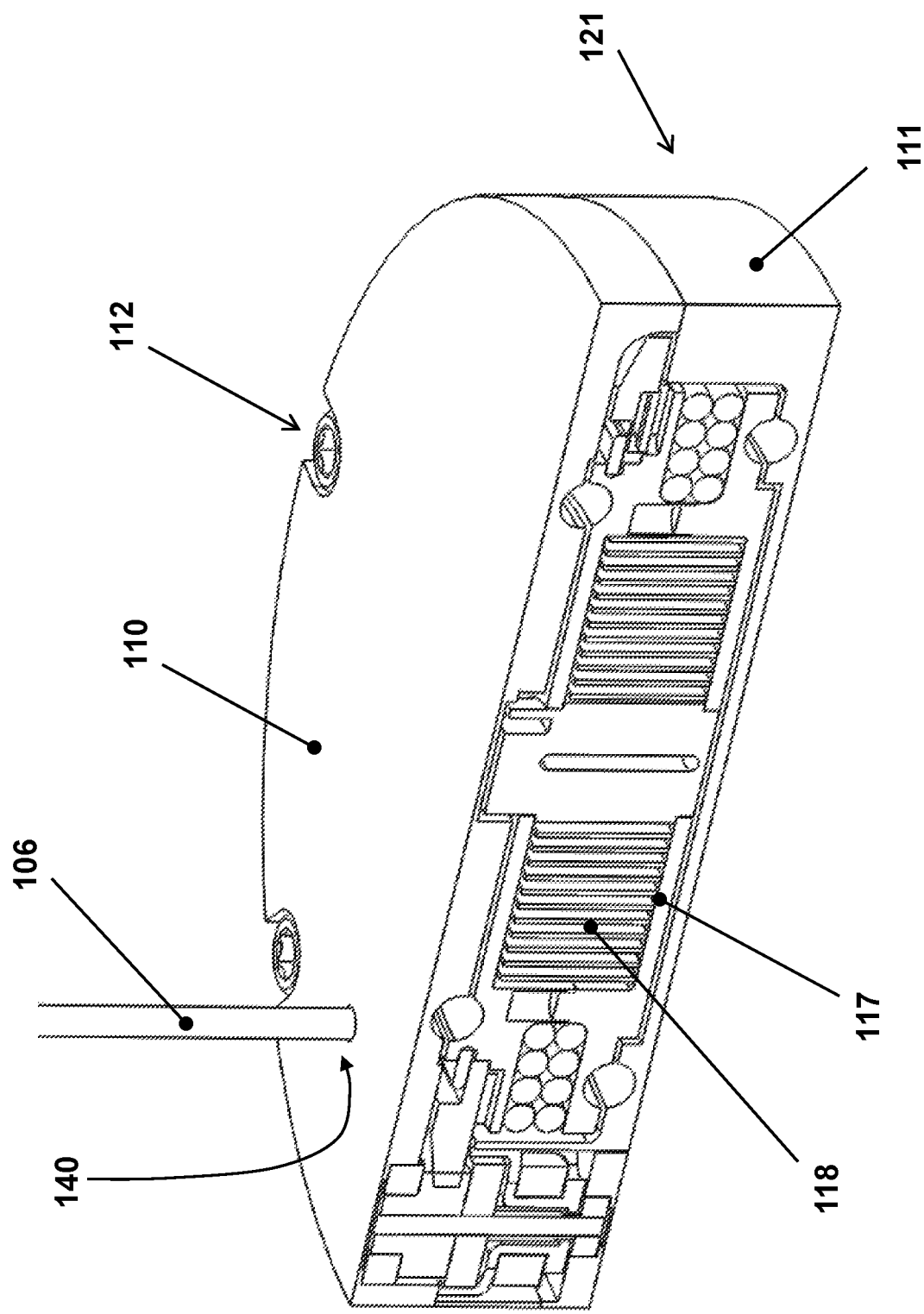
FIG. 3 illustrates a cross-sectional view of the gravity dropped or ejected weapon release event detection device with an integrated electrical generator of FIG. 1 showing the internal components of the device.

FIG. 1 illustrates one embodiment of the gravity dropped or ejected weapon release event detection device with an integrated electrical generator, generally referred to by reference numeral 100 and alternatively referred to hereinafter simply as a "release event detection and generator." The overall dimensions of the cylindrical release event detection and generator 100 are 2.1 inch in diameter and 0.44 inch in height and the generator of the device upon pulling the device cable upon weapon release is over 100 mJ. However, those skilled in the art will appreciate that other shapes and/or sizes, as well as being configured for other power outputs, are also possible. FIG. 1 shows a casing 102 having a power output, such as a wire 104 and a lanyard 106 extending therefrom. FIG. 2 shows the top view of the release event detection and generator 100 of FIG. 1 with the device casing top plate shown as transparent to show the internal components of the device. FIG. 3 is a cross-sectional view of the release event detection and generator 100 of FIG. 1 showing most of the internal parts of the device. In the cross-sectional view of FIG. 3 the potential energy storage spring element 118 of the release event detection and generator 100 is shown and its assembly into the device 100 and its operation is described later in this disclosure.

The release event detection and generator 100 of FIG. 1 is provided with a two-piece casing 121, with a top component 110 and a bottom component 111 as shown in FIG. 3, which are connected together by four screws 112. The proper positioning of the top and bottom components 110 and 111, respectively, during the assembly is ensured by the provided two locating pins 113 as shown in FIG. 2.

Figure 4:
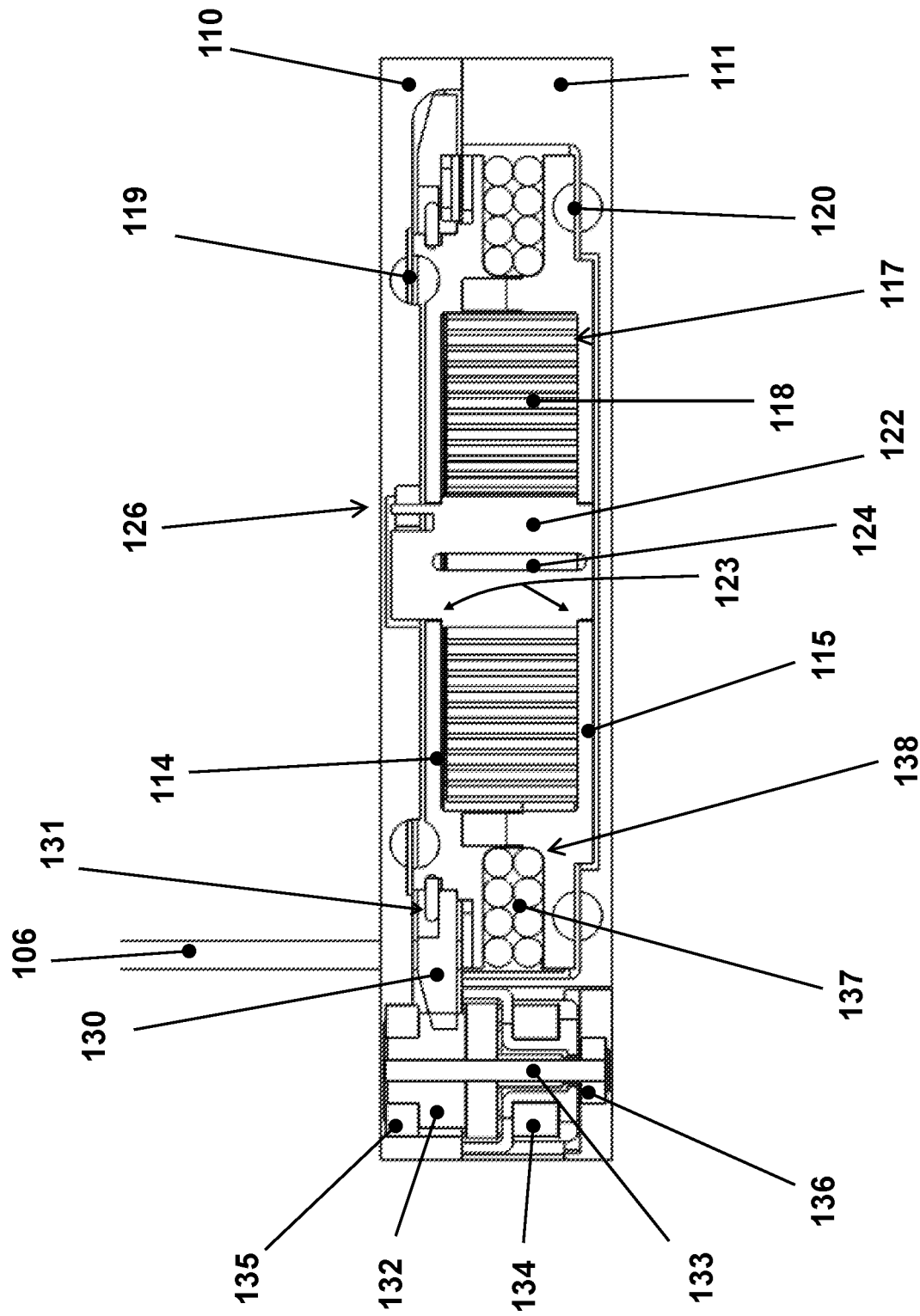
FIG. 4 illustrates the frontal view of the cross-sectional view of FIG. 3.
Figure 5:
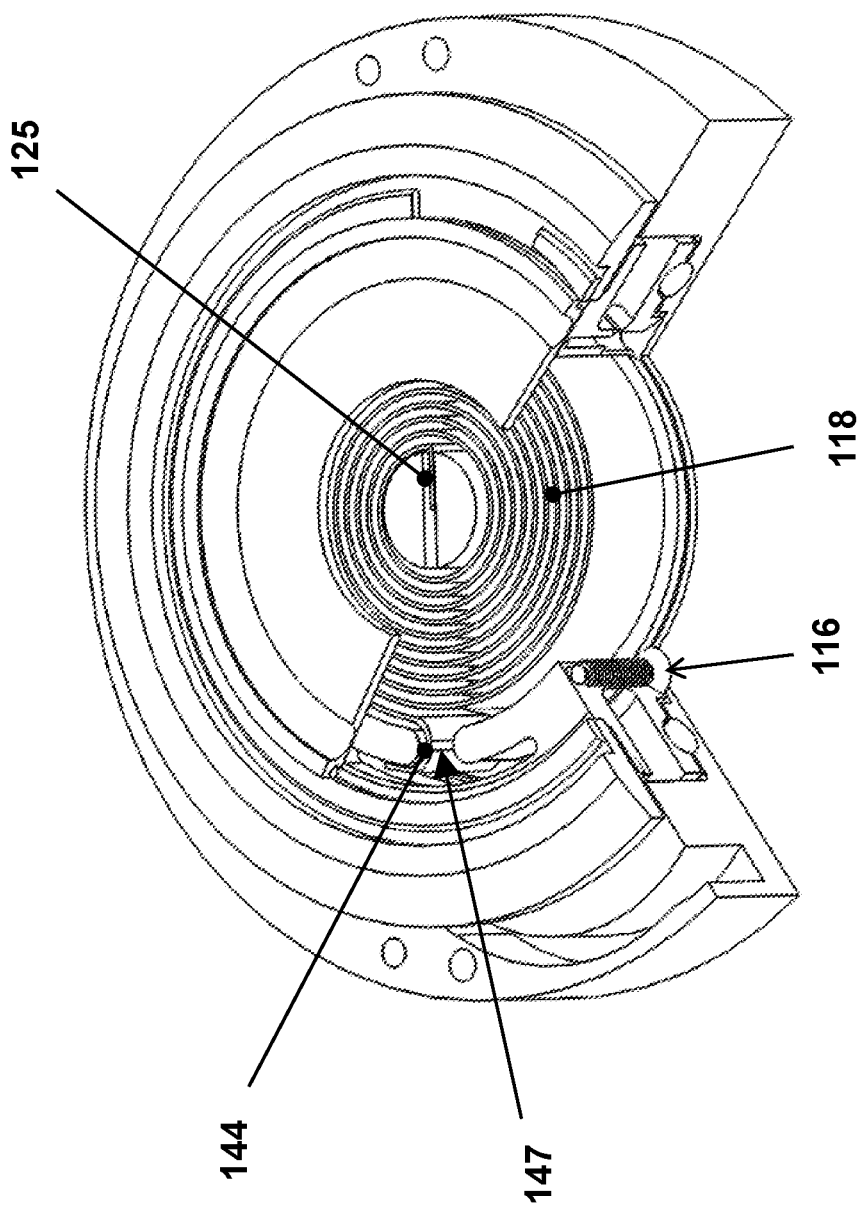
FIG. 5 illustrates the power spring assembly inside the two-piece drum of the gravity dropped or ejected weapon release event detection device with an integrated electrical generator of FIG. 1.

The cable drum is also two-piece as indicated by a top component 114 and a bottom component 115 as can be seen in the frontal view of FIG. 4 of the cross-sectional view of FIG. 3. The cable drum assembly of the two components 114 and 115 is indicated in FIGS. 3 and 4 and later illustrations with the numeral 117. The two components 114 and 115 are connected together by at least two screws (not shown), after the potential energy storing power spring 118 has been assembled into the cable drum as can be seen in FIG. 4. As can be seen in FIG. 5, the cable drum assembly 117 is mounted inside the two-piece casing 121 is via the built-in ball bearings 119 and 120, provided between the top component 110 of the two-piece casing 121 and the top component 114 of the cable drum assembly 117 and between the bottom component 111 of the two-piece casing 121 and the bottom component 115 of the cable drum assembly 117, respectively, to minimize friction losses as the cable drum assembly 117 rotates, FIG. 4.

A shaft 122 is securely mounted and centered inside the cable drum assembly 117 by the provided steps 123 during the cable drum assembly. The shaft 122 is provided with the slot 124, within which the inner end 125 of the potential energy storing power spring 118 is held as shown in FIG. 5. The shaft 112 is also provided by a slot 126 on its top end at the top component 110 of the two-piece casing 121, FIGS. 2 and 4, in which the end of the side 127 of a U-shaped spring element 129 is positioned at the time of the release event detection and generator 100 assembly. The side 128 of the U-shaped spring element 129 is fixedly attached to the inside surface of the top component 110 of the two-piece casing 121, FIG. 2, in a provided groove (not shown in FIG. 2), while its side 127 is free to rotate relative to the side 128. In the configuration shown in FIG. 2, the free end of the side 127 of the U-shaped spring element 129 is positioned inside the slot 126 on the top side of the shaft 122. As a result, the shaft 122 is prevented from rotating in the counterclockwise direction as observed in the isometric view of FIG. 2. It is noted that the sides 127 and 128 of the U-shaped spring element 129 are essentially touching in normal conditions and the side 127 has to be forcibly rotated away from the fixed side 128 to insert its end into the slot 126 of the shaft 122. As a result, once the shaft 126 is rotated in the clockwise direction as viewed in FIG. 2, the engaging free end of the side 127 exits the slot 126 on the shaft 122 and is returned into essential contact with the side 128 of the U-shaped spring element 129. As a result, the shaft 122 is then free to rotate in either clockwise or counterclockwise direction.

The outer end 144 of the potential energy storing power spring 118 is fixed to the inner side of the cable drum assembly 117 in the provided slot 147 as shown in FIG. 5.

A gear 130 is assembled onto the top component 114 of the cable drum assembly 117 as shown in FIG. 2 and is held in the viewed position by the retaining ring 131. The gear 130 is free to rotate with respect to the cable drum assembly 117, but is provided with a ratchet type mechanism 146 that allows counterclockwise rotation of the cable drum assembly 117 relative to the gear 130 (as held fixed relative to the two-piece casing 121), but prevents clockwise rotation of the cable drum assembly 117 relative to the gear 130.

Figure 6:
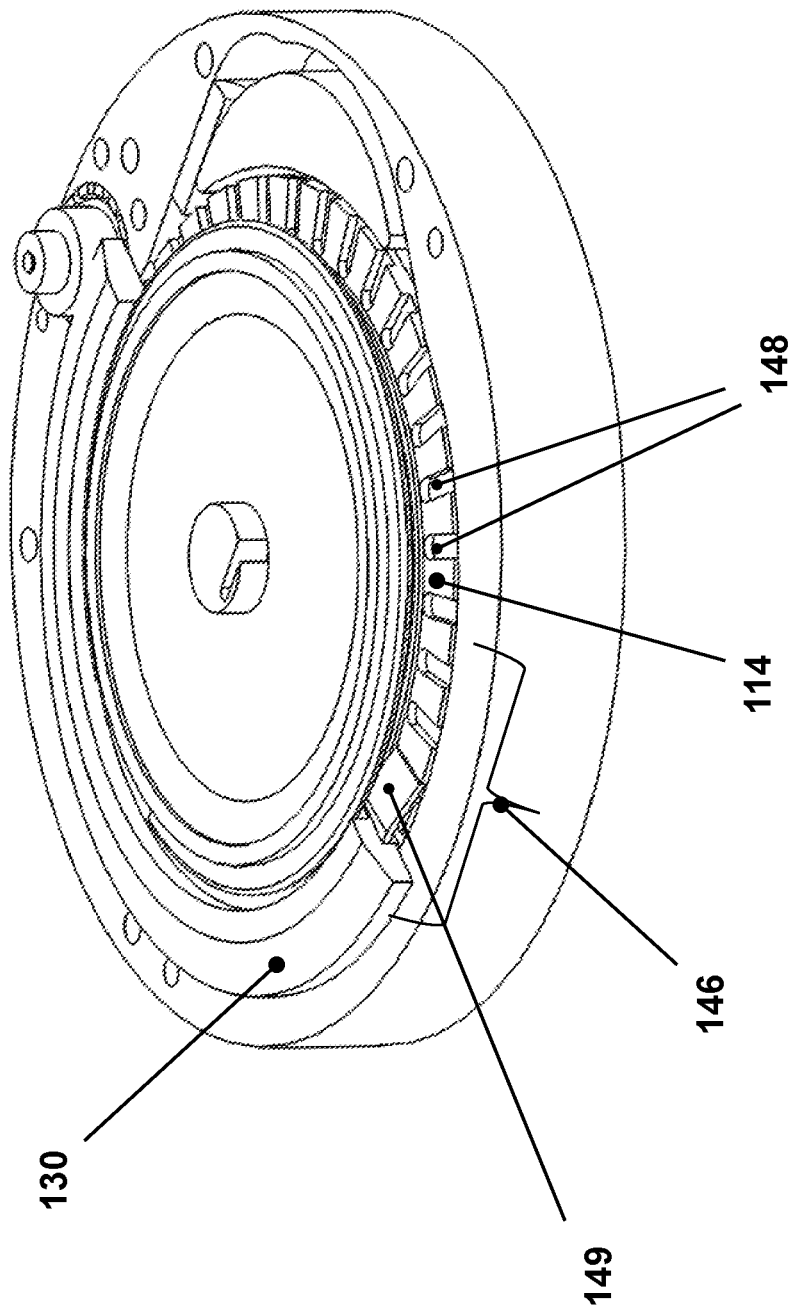
FIG. 6 illustrates the ratchet mechanism between the gear and the two-piece drum of the gravity dropped or ejected weapon release event detection device with an integrated electrical generator of FIG. 1.

The details of a possible ratchet mechanism 146 that is provided between the gear 130 and the cable drum assembly 117 is shown in FIG. 6. As can be seen in FIG. 6, the ratchet mechanism 146 consists of the pawl 149, which is fixedly attached to the bottom surface of the gear 130, and is preferably made of a bent strip of spring steel which is attached to the gear 130 by crimping in a provided slot or when space allows at least one screw or rivet (not shown). The pawl 149 is thereby provided with its integral spring action and living rotary joint, thereby significantly simplifying its design and requiring a very small space for its assembly and operation. The top surface of the top component 114 of the cable drum assembly 117 is provided with preferably equally spaced grooves 148, with which the pawl 149 engages to provide the ratcheting function that was previously described.

The gear 130 is engaged with the pinion 132, which drives the shaft 133 of the electromagnetic generator 134. The shaft 133 is supported by the ball bearings 136 and 136, which are mounted in the top component 110 and bottom component 111, respectively, of the two-piece casing 121, as shown in FIG. 4. The output of the electromagnetic generator 134 is carried out by the wire 104, FIGS. 1 and 2, that passes through a provided opening on the side of the bottom component 111 of the two-piece casing 121.

One end of a cable 137 is securely held to the inside wall of the U-shaped groove 138 around the cable drum assembly 117, FIG. 4, preferably tightly in a radial hole or tangential groove (not shown). The cable 137 is then wound several turns (8 turns in FIG. 4) around the cable drum assembly 117 inside the U-shaped groove 138. The cable 137 is then passed through the provided hole 139 in the gear 130, FIG. 2, and through the hole 140 in the top component 110 of the two-piece casing 121, as shown in FIG. 3.

The release event detection and generator 100 of FIG. 1 is used in operation as follows. As an example, the event detection and generator 100 may be mounted inside the weapon 142, with the cable 106 of the event detection and generator brought out through a provided hole (not shown) in the shell of the weapon. Once the weapon is mounted onto the rack or the like of the aircraft, the end 141 of the cable 106 is firmly attached to the aircraft, usually via a rack.

When the weapon 142 is released from the rack or ejected from the aircraft, the separation of the weapon from the aircraft due to gravity and/or ejection force will begin to pull the cable 106 out of the release event detection and generator 100 of FIGS. 1 and 2 through the opening 143 in the weapon. As the cable 106 begins to be pulled from the release event detection and generator 100, the cable drum assembly 117 begins to rotate in the counterclockwise direction as the release event detection and generator 100 is viewed in FIG. 2. During this time, the end of the side 127 of a U-shaped spring element 129 is engaged with the slot 126 on the shaft 122, thereby preventing it from rotating with the cable drum assembly in the counterclockwise direction as viewed in FIG. 2. As a result, the shaft 122 and thereby the inner end 125 of the potential energy storing power spring 118 is held fixed to the two-piece casing 121 of the release event detection and generator 100, which is in turn fixedly attached to the released weapon 142. However, since the outer end 144 of the potential energy storing power spring 118 is fixed to the inside of the cable drum assembly 117, as the cable drum assembly 117 is rotated in the counterclockwise direction as viewed in FIG. 2, the potential energy storing power spring 118 is wound and potential energy is stored in the power spring 118.

The cable drum assembly 117 is rotated in the counterclockwise direction as the release event detection and generator 100 is viewed in FIG. 2 and increasing amounts of potential energy keeps on being stored in the potential energy storing power spring 118 by its increased winding until the end of the cable 106 that is securely held to the inside wall of the U-shaped groove 138 around the cable drum assembly 117, FIG. 4, is reached and the said end is pulled through the hole 139 in the gear 130, FIG. 2, and through the hole 140 in the top component 110 of the two-piece casing 121, as shown in FIG. 3.

It is appreciated that while the cable drum assembly 117 is being rotated by the pulling of the cable 106 in the counterclockwise direction as the release event detection and generator 100 is viewed in FIG. 2, the ratchet type mechanism 146 allows counterclockwise rotation of the cable drum assembly 117 relative to the gear 130 (as held fixed relative to the two-piece casing 121).

Then as the end of the cable 106 exits the hole 139 in the gear 130, FIG. 2, the gear becomes free to rotate.

At this point, the wound potential energy storing power spring 118 begins to unwind and transfer its stored potential energy to the cable drum assembly 117 by rotating it in the clockwise direction as the release event detection and generator 100 is viewed in FIG. 2. At this time, the ratchet type mechanism 146 which only allows counterclockwise rotation of the cable drum assembly 117 relative to the gear 130, is also forced to rotate with the cable drum assembly 117 by the ratchet type mechanism 146. The gear 130 will in turn begin to rotate the pinion 132 of the electromagnetic generator 134 and cause it to begin to generate electrical energy.

At this time, the voltage (current) generated by the electromagnetic generator 134 indicates the exit of the end of the cable 106 from the release event detection and generator 100, thereby indicating the event of weapon release from the aircraft. The release event can thereby be detected by the weapon fuzing electronics and all other electrical and electronic devices onboard the weapon.

The wound potential energy storing power spring 118 will keep unwinding and transferring its stored potential energy to the clockwise rotating cable drum assembly 117 and the gear 130 until it is fully unwound. At this time the cable drum assembly 117 will begin to force the potential energy storing power spring 118 to keep rotating in the clockwise direction, as a result of which the inner end 125 of the power spring 118 begins to rotate the shaft 122 in the clockwise direction as the release event detection and generator 100 is viewed in FIG. 2. The clockwise rotation of the shaft 122 causes the end of the side 127 of the U-shaped spring element 129 to disengage the slot 126 on the shaft 122, FIG. 2, thereby causing the assembly of the shaft 122, the potential energy storing power spring 118, the cable drum assembly 117, and the gear 130 to keep on rotating together in the clockwise direction as the release event detection and generator 100 is viewed in FIG. 2. The kinetic energy stored in the latter clockwise rotating assemblage is transferred to the electromagnetic generator 134 by the gear 130 via the pinion 132 to generate electrical energy.

Figure 8:
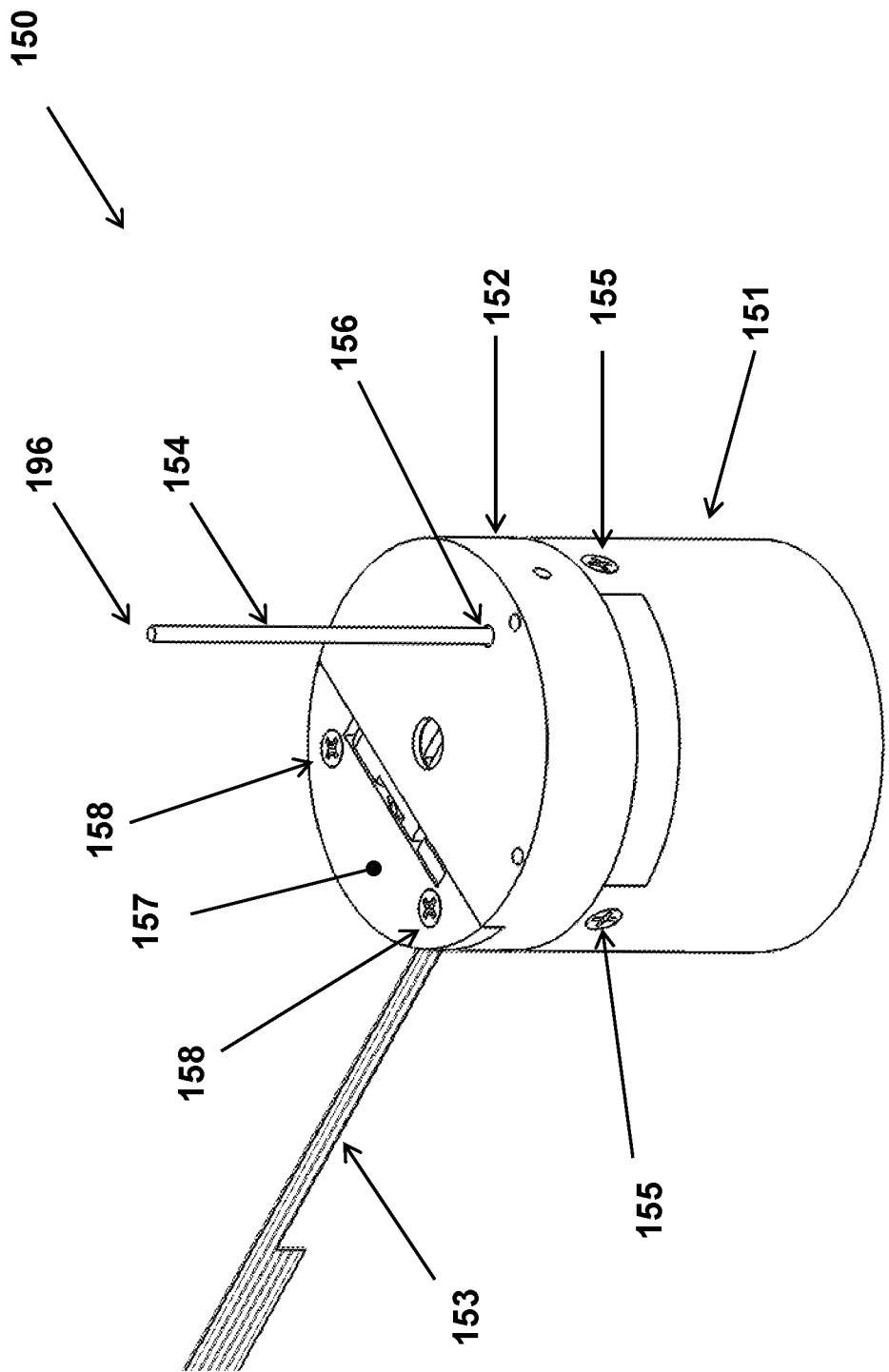
FIG. 8 illustrates an isometric view of another embodiment of the gravity dropped or ejected weapon release event detection device with an integrated electrical generator.

FIG. 8 illustrates another embodiment 150 of the gravity dropped or ejected weapon release event detection device with an integrated electrical generator of the present invention, hereinafter also referred to simply as a "release event detection and generator." The overall dimensions of the cylindrical release event detection and generator 150 are 1.5 inch in diameter and 1.5 inch in height and the generator of the device upon pulling the device cable upon weapon release is over 200 mJ. However, those skilled in the art will appreciate that other shapes and/or sizes, as well as being configured for other power outputs, are also possible.

As can be seen in FIG. 8, the release event detection and generator 150 is constructed with a two-piece casing, indicated by numerals 151 and 152 in FIG. 8. The two pieces 151 and 152 of the casing are fixedly attached by preferably more than one screw 155. The two-piece casing assembly is indicated by the numeral 164, FIG. 10.

FIG. 8 shows the release event detection and generator 150 having a power output, such as a wire 153 and a lanyard 154 that is exiting from the hole 156 provided in the top piece 152 of the device casing. Attached to the top piece 152 of the casing 164 of the release event detection and generator 150 is the "electromagnetic generator assembly" 157, which is constructed as a separate module, and is attached to the top piece 152 of the casing by screws 158.

Figure 9:
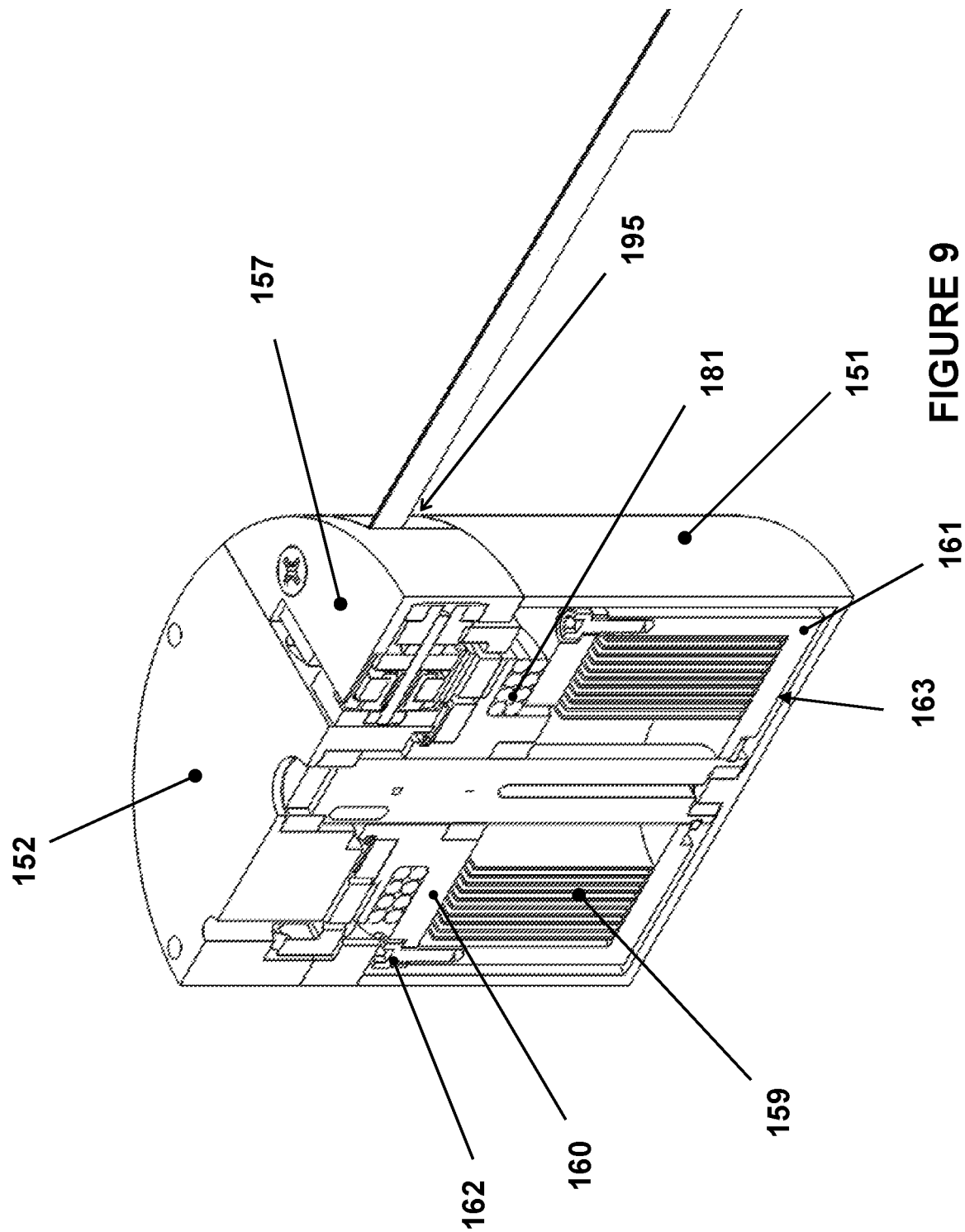
FIG. 9 illustrates a cross-sectional view of the gravity dropped or ejected weapon release event detection device with an integrated electrical generator of FIG. 8 showing the internal components of the device.

FIG. 9 is a cross-sectional view of the release event detection and generator 150 of FIG. 8 showing most of the internal parts of the device. In the cross-sectional view of FIG. 9 the potential energy storage spring element 159 of the release event detection and generator 150 is clearly shown for and its assembly and operation is described later in this disclosure.

Figure 10:
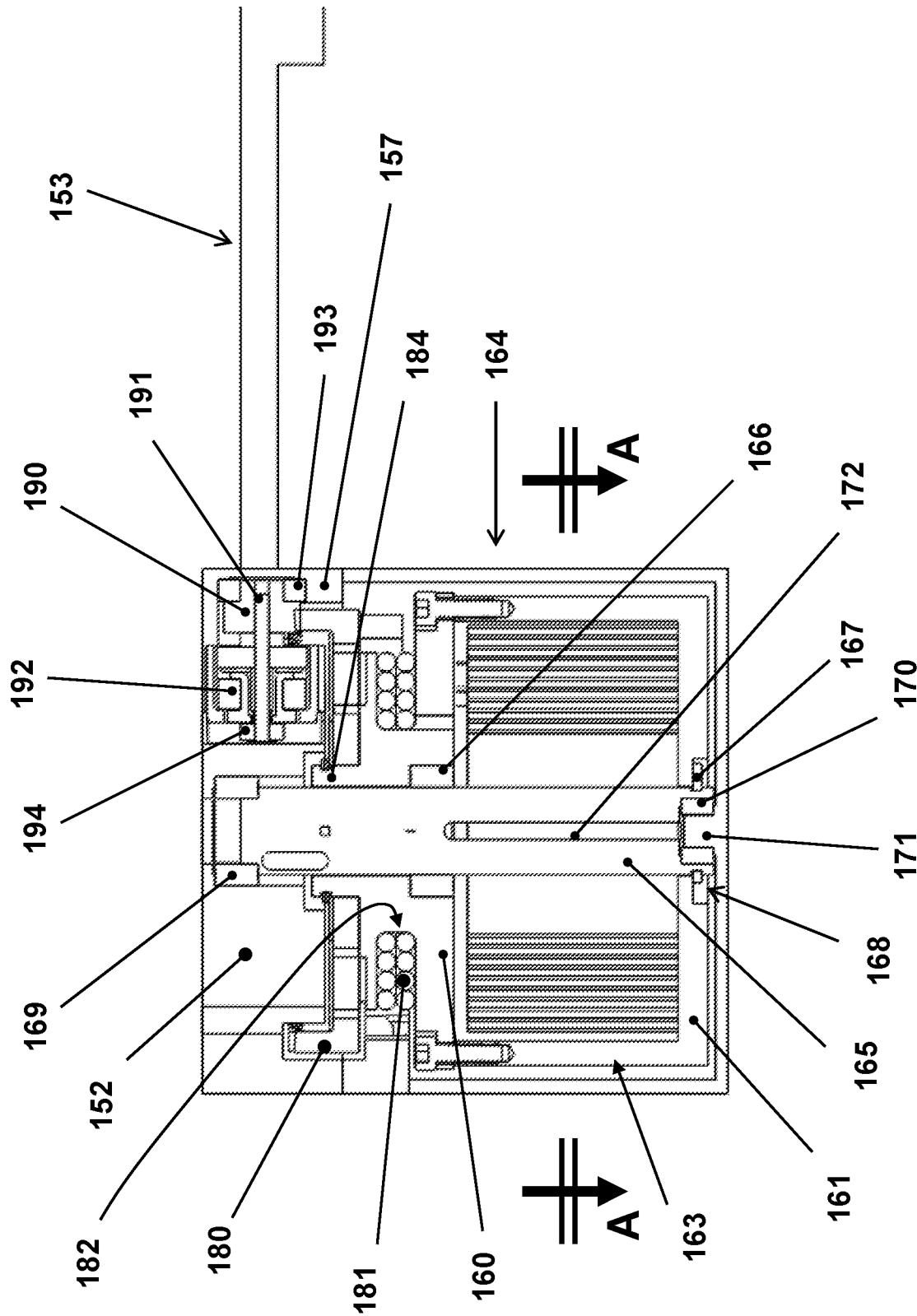
FIG. 10 illustrates the frontal view of the cross-sectional view of FIG. 9.

The cable drum is also two-piece as indicated by a top component 160 and a bottom component 161 as can be seen in the cross-sectional view of FIG. 9 and its frontal view of FIG. 10. The cable drum assembly with the two components 160 and 161 is indicated in FIG. 9 and in later illustrations by the numeral 163. The two components 160 and 161 are connected together by at least two screws 162, after the potential energy storing power spring 159 has been assembled into the cable drum 163.

As can be seen in FIG. 10, the cable drum assembly 163 is mounted inside the two-piece casing 164 on the shaft 165 by the ball bearing 166 on the top as viewed in FIG. 10, and rides directly on the shaft 165 on the bottom side, where it is held in position by the retaining ring 167 that is mounted in a groove on the shaft. In FIG. 10 the base surface of the two-piece casing 164 is provided with a recess 168 to accommodate the retaining ring 167 for the purpose of minimizing the occupied space.

The shaft 165 is centrally mounted inside the two-piece casing 164 on the top (as viewed in FIG. 10) by the ball bearing 169, which is mounted in the top piece 152 of the casing 164, and on the bottom by the ball bearing 170, which is mounted in the bottom piece 151 of the casing 164. It noted that as can be seen in FIG. 10, the ball bearing 170 is mounted inside the shaft 165 by its outer race in a provided pocket and that the inner race of the ball bearing 170 is mounted in a provided cylindrical appendage 171 inside the bottom piece 151 of the casing 164. This method of assembly provides for a compact assembly for the release event detection and generator 150.

Figure 13:
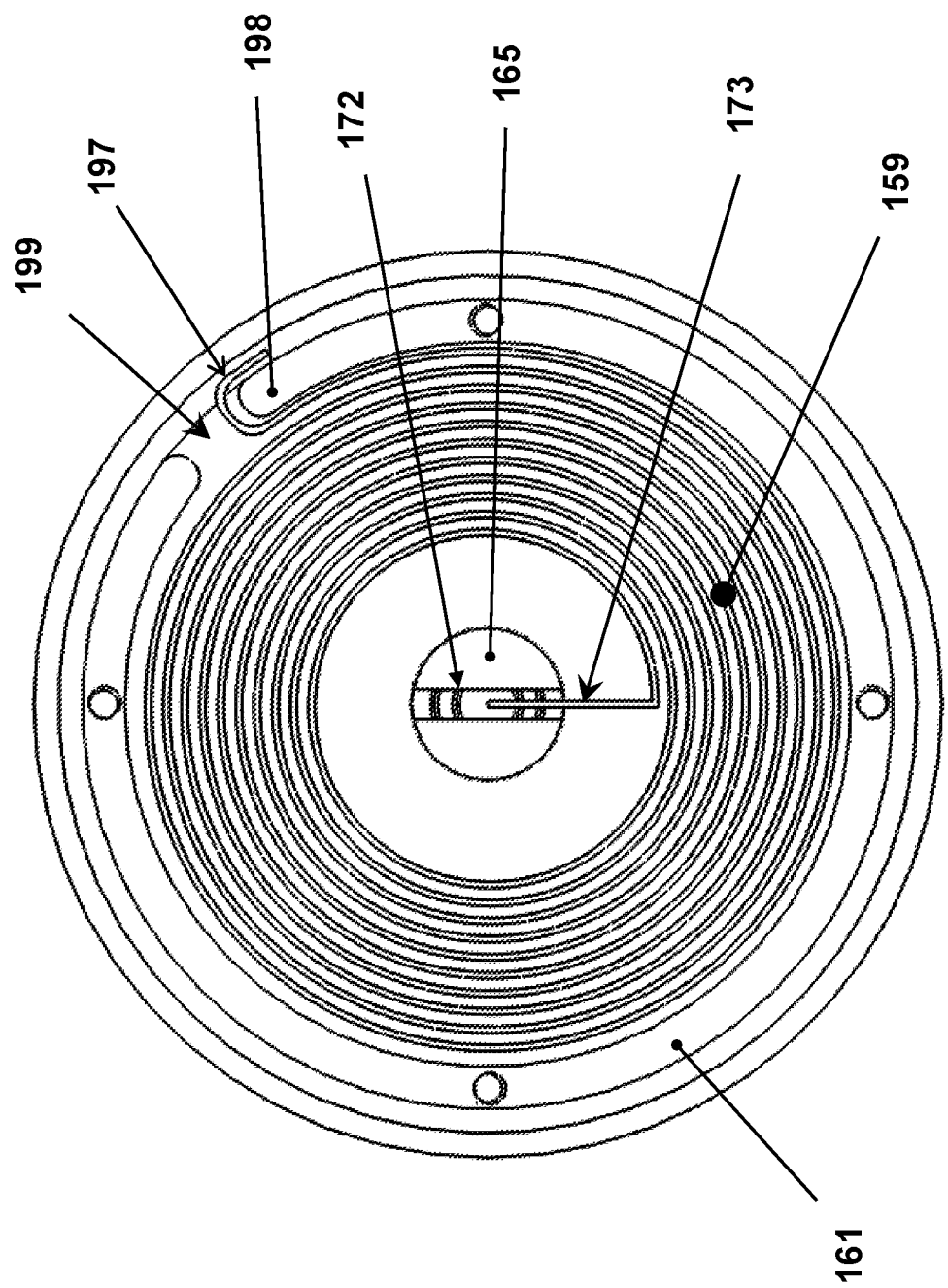
FIG. 13 illustrates the cross-section A-A of FIG. 10 showing the power spring assembly inside the release event detection and generator embodiment of FIG. 8.

FIG. 13 shows the cross-section A-A of FIG. 10. The shaft 165 is provided with the slot 172, FIGS. 10 and 13, within which the inner end 173 of the potential energy storing power spring 159 is held as shown in FIG. 13. The outer end 197 of the potential energy storing power spring 159 is fixed to the inner side of the bottom component 161 of the cable drum assembly 163 over the provided end 198 of the slot 199, as shown in the cross-section view of FIG. 13.

Figure 11:
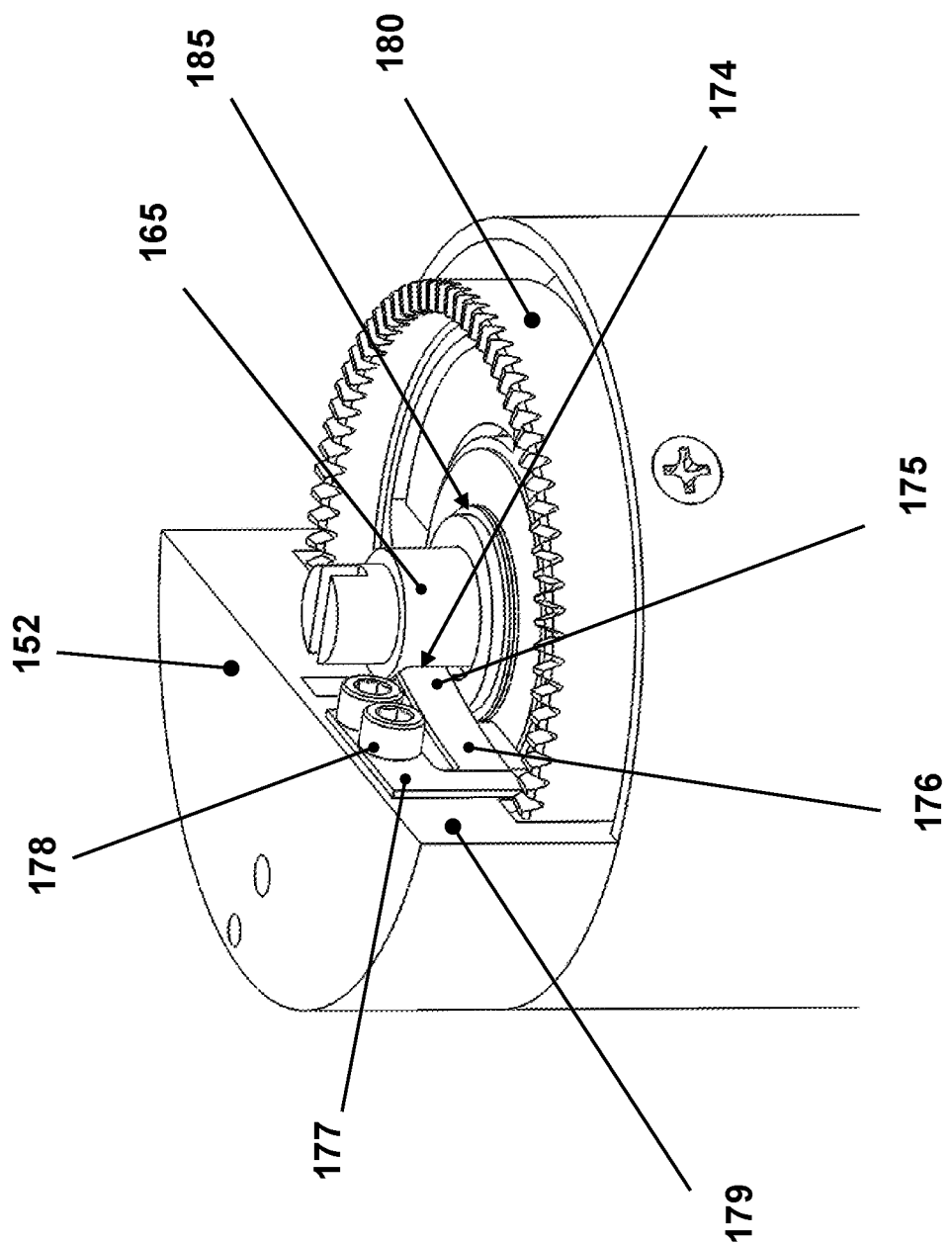
FIG. 11 illustrates the cut-away view of the top section of the release event detection and generator of FIG. 8 showing the one-way shaft locking mechanism of the device.
Figure 12:
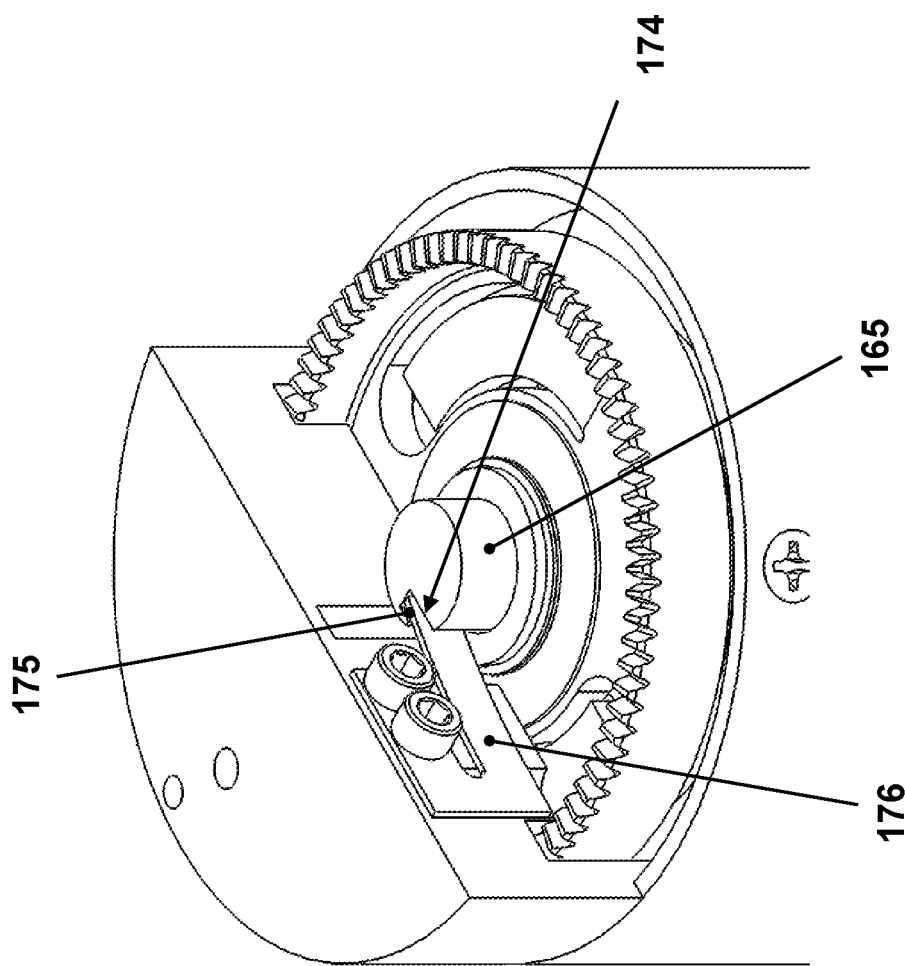
FIG. 12 illustrates the top view of the release event detection and generator cut-away view of FIG. 11.

The shaft 165 is also provided with a slot 174 on its top end as is shown in FIG. 11 and its top view of FIG. 12 (in which the top portion of the shaft, FIG. 11, is cut out to clearly show the slot 174), in which one end 175 of the U-shaped spring element 176 is positioned at the time of the release event detection and generator 150 assembly. The other side 177 of the U-shaped spring element 176 is fixedly attached to the inside surface of the surface 179 provided on the top piece 152 of the casing 164 by the screws 178 as is shown in FIG. 11. As a result, the shaft 165 is prevented from rotating in the counterclockwise direction relative to the casing 164 of the release event detection and generator 150 as observed in the isometric view of FIG. 11 and the top view of FIG. 12. It is noted that the U-shaped spring element 176 is normally flat and that the end 175 is deflected elastically away from the surface 179 to be inserted into the slot 174 of the shaft 165. As a result, once the shaft 165 is rotated in the clockwise direction as viewed in FIGS. 11 and 12, the engaging free end of the side 175 exits the slot 174 on the shaft 165 and is returned into essential contact with the side 179 of the top piece 152 of the casing 164. As a result, the shaft 165 is then free to rotate in either clockwise or counterclockwise direction.

Figure 14:
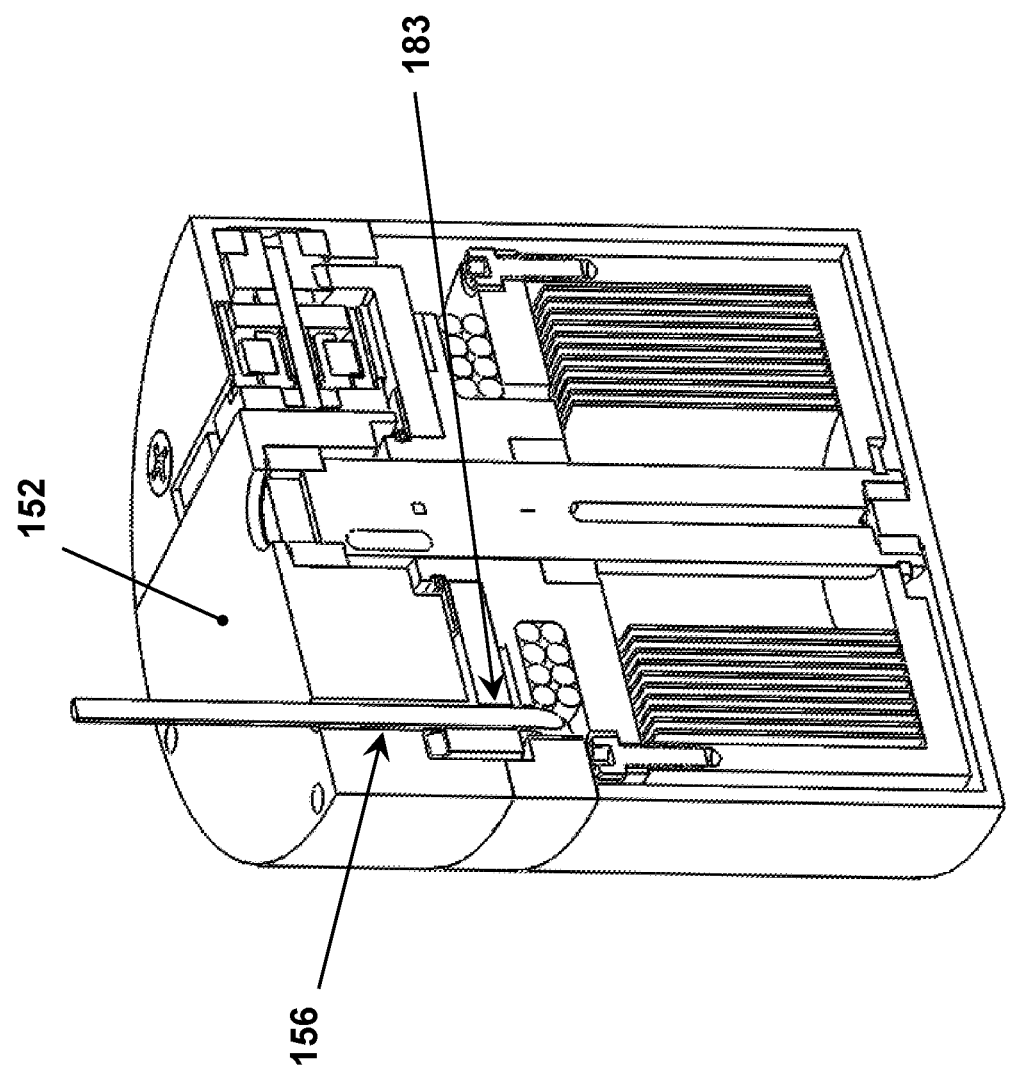
FIG. 14 illustrates the cable exit points from the cable drum assembly to the outside of the release event detection and generator embodiment of FIG. 8.

One end of a cable 181, FIGS. 9 and 10, is securely held to the inside wall of the U-shaped groove 182 provided around the top component 160 of the cable drum assembly 163, FIG. 10, preferably tightly in a radial hole or tangential groove (not shown). The cable 181 is then wound several turns (8 turns in FIG. 10) around the cable drum assembly 163 inside the U-shaped groove 182. The cable 181 is then passed through the provided hole 183 in the gear 180 and through the hole 156 in the top component 152 of the two-piece casing 164, as shown in FIG. 14.

Figure 15:
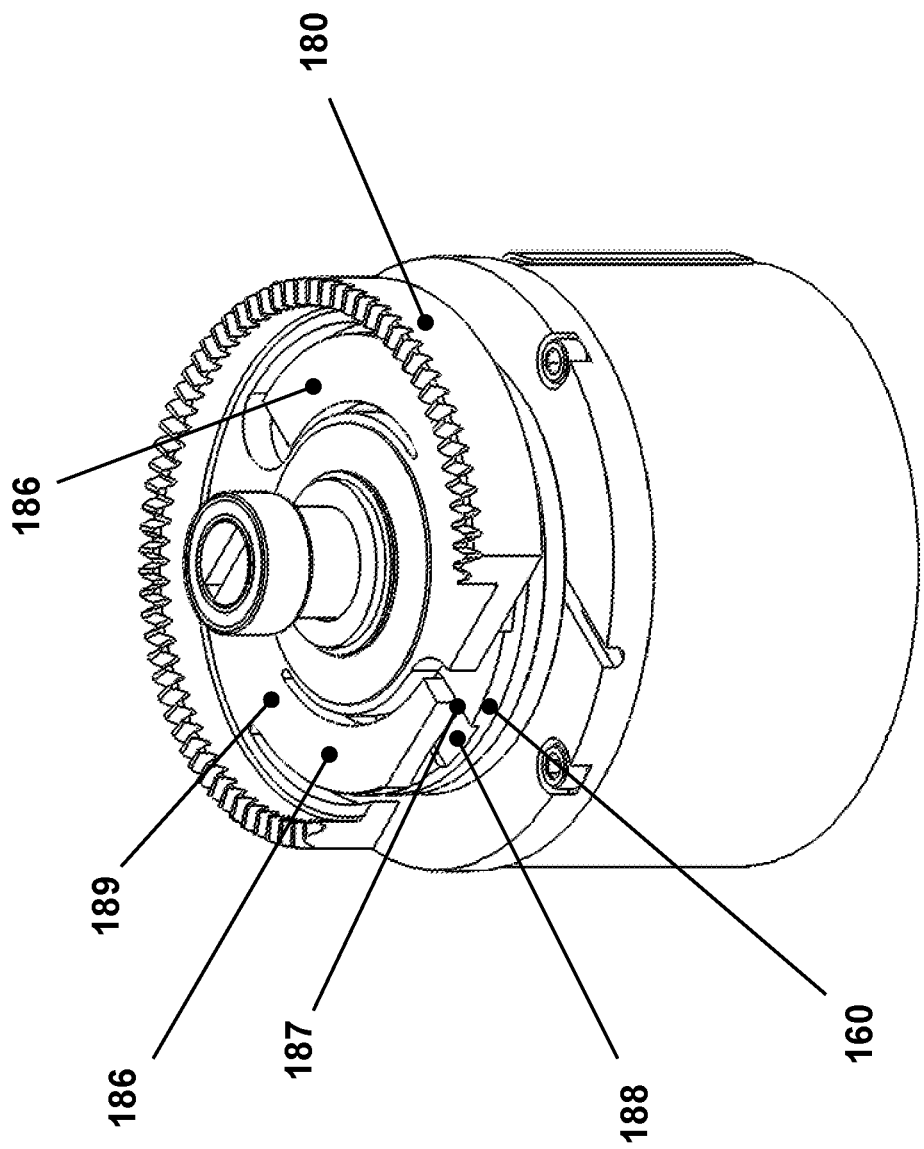
FIG. 15 illustrates a cut-away view of the top section of the release event detection and generator of FIG. 8 showing the passing of the cable through the holes provided in the device gear and casing.

A gear 180 is assembled onto the neck 184 of the top component 160 of the cable drum assembly 163, FIG. 10, and is held in the viewed position by the retaining ring 184 as shown in FIGS. 10 and 11. The gear 180 is free to rotate with respect to the cable drum assembly 163, but is provided with a ratchet type mechanism consisting of at least one link 186 which is integral to the gear 180 and attached to it with a living rotary joint 189 as shown in FIG. 15. The link 186 together with its downward extended tip 187, FIG. 15, constitute the pawl of the ratchet mechanism between the gear 180 and the top component 160 of the cable drum assembly 163. The top surface of the top component 160 of the cable drum assembly 163 is provided with preferably equally spaced radially directed grooves 188 (preferably at least every 15-20 degrees), for the tip 187 of the pawl to engage. As can be observed in FIG. 15, the provided ratchet mechanism between the gear 180 and the top component 160 of the cable drum assembly 163 allows counterclockwise rotation of the top component 160 and thereby the cable drum assembly 163, FIG. 10, relative to the gear 180, but prevents clockwise rotation of the cable drum assembly 163 relative to the gear 180. It is noted that in the assembled release event detection and generator 150 and before its activation as described later in this disclosure, the cable 154 prevents rotation of the gear 180 relative to the two-piece casing 164 by passing through the provided hole 183 in the gear 180 and the hole 156 in the top component 152 of the two-piece casing 164, as shown in FIG. 14.

The gear 180 is engaged with the pinion 190, which drives the shaft 191 of the electromagnetic generator 192, FIG. 10. The shaft 191 is supported by the ball bearings 193 and 194, which are mounted in the "electromagnetic generator assembly" 157, FIGS. 8-10, of the top component 152 of the two-piece casing 164. The output of the electromagnetic generator 192 is carried out by the wire 153, FIGS. 8 and 10, that passes through a provided opening 195 on the side of the "electromagnetic generator assembly" 157, FIG. 9.

The release event detection and generator 150 of FIG. 8 is used in operation similar to the embodiment 100 of FIG. 1. As an example, the event detection and generator 150 may also be mounted inside the weapon 142 of FIG. 7, with the cable 154 (106 in FIG. 7) of the event detection and generator 150, FIG. 8, brought out through a provided hole (not shown) in the shell of the weapon 142. Once the weapon is mounted onto the rack or the like of the aircraft, the end 186 shown in FIG. 8 (141 in FIG. 7) of the cable 154 is firmly attached to the aircraft, usually via a rack.

When the weapon 142 is released from the rack or ejected from the aircraft, the separation of the weapon from the aircraft due to gravity and/or ejection force will begin to pull the cable 154 out of the release event detection and generator 150 of FIG. 8 through the opening 143 in the weapon. As the cable 154 begins to be pulled from the release event detection and generator 150, the cable drum assembly 163, FIG. 10, begins to rotate in the counterclockwise direction as the release event detection and generator 150 is viewed in FIGS. 8 and 9. During this time, the end of the side 175 of the U-shaped spring element 176 is engaged with the slot 174 on the shaft 165, FIG. 12, thereby preventing it from rotating with the cable drum assembly 163 in the counterclockwise direction as viewed in FIGS. 8 and 9. As a result, the shaft 165 and thereby the inner end 173 of the potential energy storing power spring 159 is held fixed to the two-piece casing 164 of the release event detection and generator 150, which is in turn fixedly attached to the released weapon 142. However, since the outer end 197 of the potential energy storing power spring 159 is fixed to the inside of the cable drum assembly 163, as the cable drum assembly 163 is rotated in the counterclockwise direction as viewed in FIGS. 8 and 9, the potential energy storing power spring 159 is wound and potential energy is stored in the said power spring.

The cable drum assembly 163 is rotated in the counterclockwise direction as the release event detection and generator 150 is viewed in FIG. 9 and increasing amounts of potential energy is stored in the potential energy storing power spring 159 by its increased winding until the end of the cable 154 that is securely held to the inside wall of the U-shaped groove 182 around the cable drum assembly 163, FIG. 10, is reached and the said end is pulled through the hole 183 in the gear 180 and the hole 156 in the top component 152 of the two-piece casing 164, as shown in FIG. 14. At this time the gear 180 becomes free to rotate relative to the two-piece casing 164 of the release event detection and generator 150.

It is appreciated that while the cable drum assembly 163 is being rotated by the pulling of the cable 154 in the counterclockwise direction as the release event detection and generator 150 is viewed in FIGS. 8 and 9, the ratchet type mechanism shown in FIG. 15 allows counterclockwise rotation of the cable drum assembly 163 relative to the gear 180 (as being held fixed relative to the two-piece casing 164).

At this point, the wound potential energy storing power spring 159 begins to unwind and transfer its stored potential energy to the cable drum assembly 163 by rotating it in the clockwise direction as the release event detection and generator 150 is viewed in FIGS. 8 and 9. At this time, the ratchet type mechanism shown in FIG. 15 which only allows counterclockwise rotation of the cable drum assembly 163 relative to the gear 180, is also forced to rotate with the cable drum assembly 163 by the said ratchet type mechanism. The gear 150 will in turn begin to rotate the pinion 190 of the electromagnetic generator 192 and cause it to begin to generate electrical energy.

At this time, the voltage (current) generated by the electromagnetic generator 192 indicates the exit of the end of the cable 154 from the release event detection and generator 150, thereby indicating the event of weapon release from the aircraft. The release event can thereby be detected by the weapon fuzing electronics and all other electrical and electronic devices onboard the weapon.

The wound potential energy storing power spring 159 will keep unwinding and transferring its stored potential energy to the clockwise rotating cable drum assembly 163 and the gear 180 until it is fully unwound. At this time the cable drum assembly 163 will begin to force the potential energy storing power spring 159 to keep rotating in the clockwise direction, as a result of which the inner end 173 of the power spring 159 begins to rotate the shaft 165 in the clockwise direction as the release event detection and generator 150 is viewed in FIGS. 8 and 9. The clockwise rotation of the shaft 165 causes the end of the side 175 of the U-shaped spring element 176 to disengage the slot 174 on the shaft 165, FIG. 11, thereby causing the assembly of the shaft 165, the potential energy storing power spring 159, the cable drum assembly 163, and the gear 180 to keep on rotating together in the clockwise direction as the release event detection and generator 150 is viewed in FIGS. 8 and 9. The kinetic energy stored in the latter clockwise rotating assemblage is thereby transferred to the electromagnetic generator 192 by the gear 180 via the pinion 190 to generate electrical energy.

As can be seen in the FIGS. 3 and 4 of the embodiment 100, the cable drum is constructed in two-pieces as indicated by a top component 114 and a bottom component 115. The cable drum assembly of the two components 114 and 115 is indicated in FIGS. 3 and 4 and together as numeral 117. The two components 114 and 115 are connected together by at least two screws (not shown), after the potential energy storing power spring 118 has been assembled into the cable drum as can be seen in FIG. 4. As can be seen in FIG. 4, the cable drum assembly 117 is mounted inside the two-piece casing 121 via the built-in ball bearings 119 and 120, provided between the top component 110 of the two-piece casing 121 and the top component 114 of the cable drum assembly 117 and between the bottom component 111 of the two-piece casing 121 and the bottom component 115 of the cable drum assembly 117, respectively, to minimize friction losses as the cable drum assembly 117 rotates, FIG. 4.

The built-in ball bearings 119 and 120, FIGS. 3 and 4, however, have relatively large diameters, and their races are machined in the top component 110 of the two-piece casing 121 and the top component 114 of the cable drum assembly 117 and between the bottom component 111 of the two-piece casing 121 and the bottom component 115 of the cable drum assembly 117, respectively. Such races, having been machined in separate halves, do not also generally have the precision, smooth surface and surface hardness that are provided in regular ball bearings. As a result, the rolling friction coefficient of the machined built-in ball bearings 119 and 120, FIGS. 3 and 4, may be significantly higher than mass-produced precision ball bearings. In addition, even if the built-in ball bearings 119 and 120 could be made with coefficients of friction of the order of the mass-produced precision ball bearings, their large diameters would generate relatively large friction moments that would oppose the rotation of the cable drum assembly 117. As a result, a considerable amount of the potential energy stored in the power spring 118 at the time of its release is consumed by the losses due to the friction moments of the built-in ball bearings 119 and 120, FIGS. 3 and 4.

An alternative design of the event detection and electrical generator embodiment 100 of FIGS. 1-6 is provided, which would avoid the use of the built-in ball bearings 119 and 120 in order to minimize the amount of mechanical energy that is lost due to the bearing friction. Such a design is of particular interest when a prescribed amount of energy is to be generated by the event detection and electrical generator and the device is desired to be as small as possible. The alternative design of the event detection and electrical generator embodiment 100 of FIGS. 1-6, which minimizes the friction losses by replacing the built-in ball bearings 119 and 120 by significantly smaller and mass-produced precision ball bearings is shown in FIG. 16 and is indicated by the numeral 200.

Figure 16:
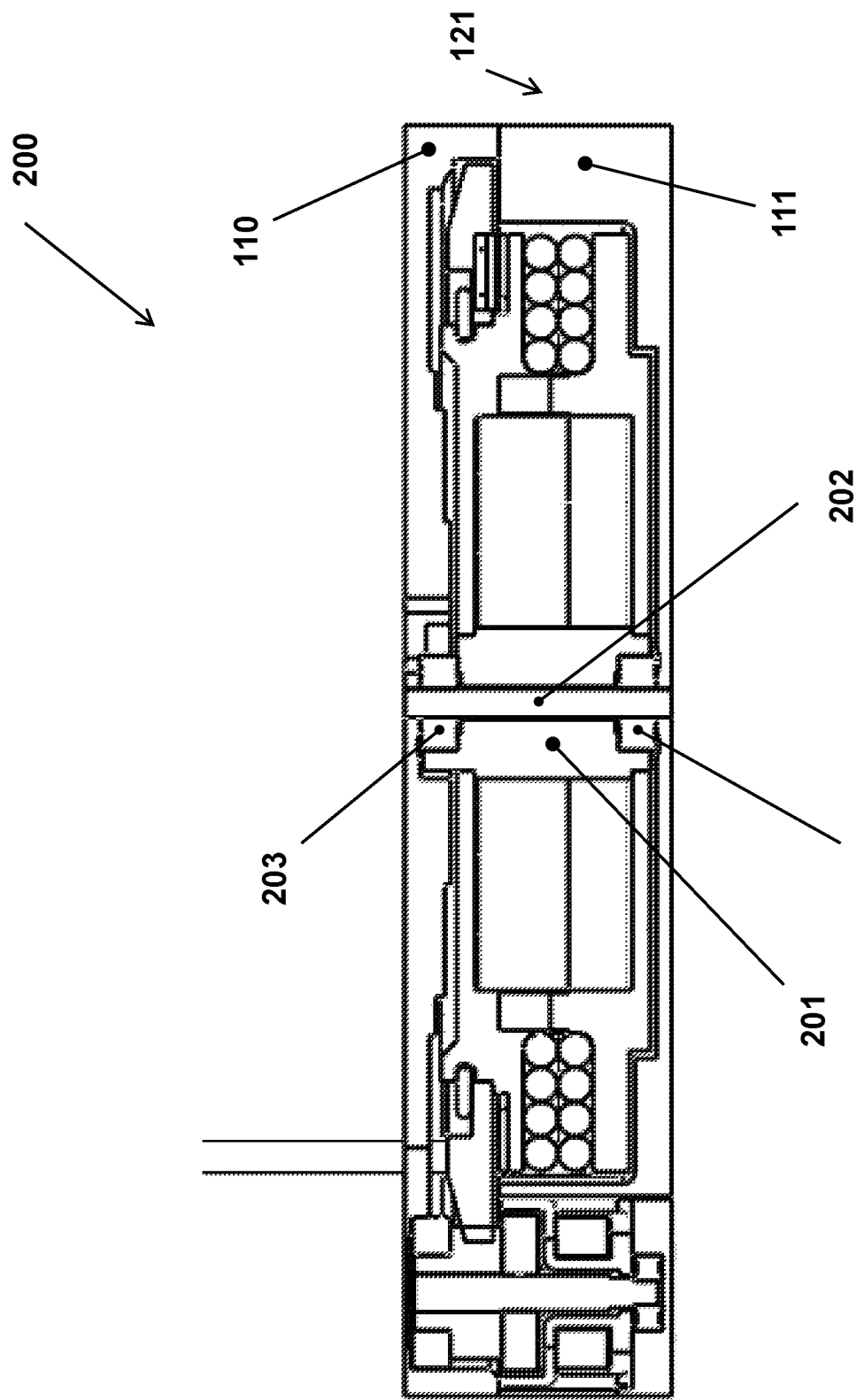
FIG. 16 illustrates a cross-sectional frontal view of an alternative embodiment gravity dropped or ejected weapon release event detection device with an integrated electrical generator showing the internal components of the device.

The frontal cross-sectional view of the alternative embodiment 200 of the event detection and electrical generator embodiment 100 of FIGS. 1-6 is shown in FIG. 16. All components of the event detection and electrical generator embodiment 200 are similar to those of the embodiment 100 of FIGS. 1-6, except for the following modifications.

In the embodiment 100 of FIGS. 1-6 and as can be seen in FIG. 4, the cable drum assembly 117 is mounted inside the two-piece casing 121 via the built-in ball bearings 119 and 120, provided between the top component 110 of the two-piece casing 121 and the top component 114 of the cable drum assembly 117 and between the bottom component 111 of the two-piece casing 121 and the bottom component 115 of the cable drum assembly 117, respectively. However, in the alternative embodiment 200 of FIG. 16, the built-in ball bearings 119 and 120 are eliminated, but the cable drum assembly 117 is still similarly mounted over the shaft 201 (similar to the shaft 122 in the embodiment 100, FIG. 4). However, in the alternative embodiment 200 of FIG. 16, the shaft 201 itself is provided with an internal shaft 202, which is mounted inside the shaft 210 via ball bearings 203 and 204, which are in turn mounted in the top component 110 and the bottom component 111 of the two-piece casing 121 event detection and electrical energy generator embodiment 200.

As a result, once released, the cable drum assembly 117 together with the shaft 201 can now freely rotate about the internal shaft 202, via the ball bearings 203 and 204. As a result, by replacing the large diameter and built-in ball bearings 119 and 120 which are generally lower in precision (due to races that are not hardened and precision finished) by significantly smaller diameter ball (or other similar) precision bearings 203 and 204, the friction losses due to these bearings are significantly reduced.

The alternative event detection and electrical energy generator embodiment 200, FIG. 16, otherwise operates as was described for the event detection and electrical energy generator embodiment 100 of FIG. 1-6.

Figure 7:
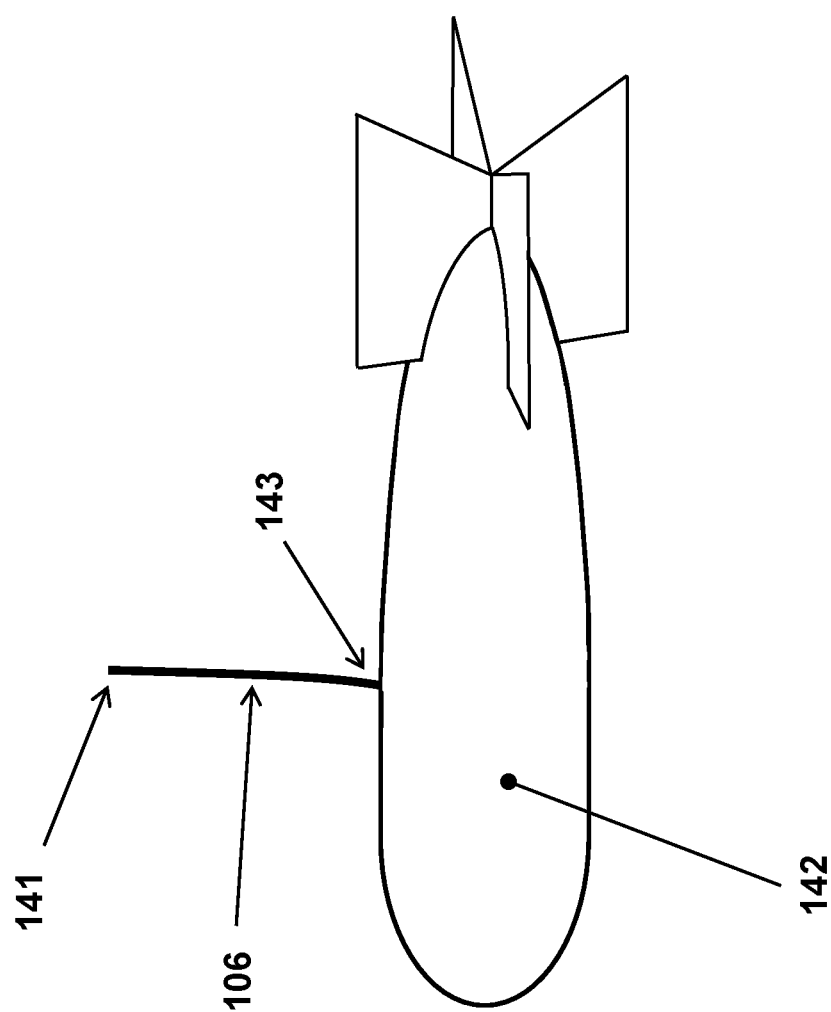
FIG. 7 illustrates one possible mounting of the gravity dropped or ejected weapon release event detection device with an integrated electrical generator of FIG. 1 to a weapon.

It will be appreciated by those having ordinary skill in the art that since as was described for the event detection and electrical energy generator embodiment 100 of FIG. 1-6, during the weapon release, FIG. 7, the cable 137, FIG. 4, is pulled essentially in a direction tangent to the cable drum assembly 117 inside the U-shaped groove 138. As a result, the force exerted by the cable 137 generates minimal bending moment in the direction perpendicular to the shaft 122 in the embodiment 100, FIG. 4, as well as to the shafts 201 and 202 in the alternative embodiment 200 of FIG. 16. As a result, the built-in ball bearings 119 and 120 in the embodiment 100 of FIGS. 1-6 and the ball bearings 203 and 204 of the embodiment 200 of FIG. 16 are subjected to negligible axial loads and relatively low lateral load (only due to the cable pulling force). As a result, the replacement of the large diameter built-in ball bearings 119 and 120 in the embodiment 100 of FIGS. 1-6 with the small diameter ball bearings 203 and 204 of the embodiment 200 of FIG. 16 has negligible effect on the integrity and operation of the event detection and electrical energy generator. However, it does significantly reduce friction losses, which may amount to as high as 30-50 percent of the available mechanical energy of the power spring for conversion to electrical energy.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A device for generating power in a gravity dropped munition, the device comprising:
   a drum;
   a cable wound around a drum;
   a generator for producing electrical energy;
   a spring configured to convert rotation of the drum to energy as the cable is unwound from the drum;
   an intermediate member selectively engaging the drum to the generator; wherein the intermediate member is disengaged from the drum when the cable is being unwound from the drum and the intermediate member is engaged with the generator when the cable is released from the drum to produce power from the generator;
   restricting means for restricting movement of the intermediate member connecting the drum to the generator while the cable is being unwound from the drum; and
   ending means for ending the restricting when the cable is released from the drum allowing the intermediate member to engage the drum with the generator to produce power from the generator.

2. The device of claim 1, wherein the intermediate member is a first gear connecting the drum to a second gear at the generator.

3. The device of claim 1, wherein the restricting means comprises means for restricting rotation of the intermediate member in a same direction as an unwinding direction of the drum as the cable is unwound from the drum.

4. The device of claim 3, wherein the restricting means comprises means for permitting rotation of the intermediate member in a direction opposite to the same direction as the unwinding direction of the drum as the cable is unwound from the drum.

5. The device of claim 1, wherein the restricting means comprises routing the cable through a portion of the intermediate member to restrict all movement of the intermediate member as the cable is unwound from the drum.

6. A device for generating power in a gravity dropped munition, the device comprising:
   a drum;
   a cable wound around a drum;
   a generator for producing electrical energy;

a spring configured to convert rotation of the drum to energy as the cable is unwound from the drum;

an intermediate member selectively engaging the drum to the generator; wherein the intermediate member is disengaged from the drum when the cable is being unwound from the drum and the intermediate member is engaged with the generator when the cable is released from the drum to produce power from the generator; and means for restricting a movement of the drum in a direction opposite to an unwinding direction as the cable is unwound from the drum.

7. The device of claim 6, further comprising means for removing the restricting of the movement of the drum in the direction opposite to an unwinding direction after the cable is fully unwound from the drum.

\* \* \* \* \*